US012294747B2

(12) United States Patent
Clucas et al.

(10) Patent No.: US 12,294,747 B2
(45) Date of Patent: *May 6, 2025

(54) WIRELESS DATA COMMUNICATION SYSTEM AND METHOD

(71) Applicant: V-NOVA INTERNATIONAL LIMITED, London (GB)

(72) Inventors: Richard Clucas, London (GB); Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,225

(22) Filed: Mar. 27, 2023

(65) Prior Publication Data

US 2023/0388564 A1 Nov. 30, 2023

Related U.S. Application Data

(63) Continuation of application No. 17/380,718, filed on Jul. 20, 2021, now Pat. No. 11,616,995.

(30) Foreign Application Priority Data

May 25, 2020 (GB) ..................................... 2007773

(51) Int. Cl.
*H04N 21/236* (2011.01)
*H04N 21/61* (2011.01)

(52) U.S. Cl.
CPC ....... *H04N 21/236* (2013.01); *H04N 21/6193* (2013.01)

(58) Field of Classification Search
CPC .......................... H04N 21/236; H04N 21/6193
See application file for complete search history.

(56) References Cited

U.S. PATENT DOCUMENTS

| 5,144,425 A * | 9/1992 | Joseph | H04N 19/15 375/E7.091 |
| 6,263,022 B1 * | 7/2001 | Chen | H04N 19/126 375/240.03 |

(Continued)

FOREIGN PATENT DOCUMENTS

| WO | 2013-011466 | 1/2013 |
| WO | 2013-011492 | 1/2013 |

(Continued)

OTHER PUBLICATIONS

Zhai et al., "Joint Source-Channel Coding for Video Communications", Handbook Image Video Processing, Chapter 1, Dec. 2005, pp. 1-36.

(Continued)

*Primary Examiner* — Michael B. Pierorazio
(74) *Attorney, Agent, or Firm* — Workman Nydegger

(57) ABSTRACT

A data communication system including a least one encoder and one decoder. The encoder encodes a received input signal into encoded output data. The data communication system includes a data communication network coupled to at least one encoder, wherein the data communication network communicates the encoded output data from the encoder to the decoder. The decoder decodes the encoded output data to generate a rendition of the input signal. The system is characterized in that the data communication network is configured to function according to joint source channel coding (JSCC). Moreover, the encoder and the decoder are configured to employ an hierarchical data structure for representing data to be communicated from the encoder to the decoder.

9 Claims, 3 Drawing Sheets

(56) References Cited

U.S. PATENT DOCUMENTS

| | | | | |
|---|---|---|---|---|
| 6,490,705 B1* | 12/2002 | Boyce | ............... | H04N 19/66 714/776 |
| 6,496,217 B1* | 12/2002 | Piotrowski | ............ | H04N 19/89 375/E7.005 |
| 6,501,797 B1* | 12/2002 | van der Schaar | ...... | H04N 19/34 708/203 |
| 6,674,477 B1* | 1/2004 | Yamaguchi | ............ | H04N 19/50 375/E7.113 |
| 7,095,782 B1* | 8/2006 | Cohen | ............... | H04N 21/2404 375/E7.02 |
| 7,958,532 B2* | 6/2011 | Paul | ............. | H04N 21/234327 725/135 |
| 8,064,389 B2* | 11/2011 | Khan | ............... | H04B 7/2123 375/240 |
| 8,072,943 B2* | 12/2011 | Khan | ................... | H04L 1/0625 370/335 |
| 8,531,321 B1 | 9/2013 | Rossato et al. | | |
| 8,711,943 B2 | 4/2014 | Rossato et al. | | |
| 8,948,248 B2 | 2/2015 | Rossato et al. | | |
| 8,977,065 B2 | 3/2015 | Rossato et al. | | |
| 9,129,411 B2 | 9/2015 | Rossato et al. | | |
| 9,300,980 B2 | 3/2016 | Rossato et al. | | |
| 9,313,495 B2 | 4/2016 | Rossato et al. | | |
| 9,509,990 B2 | 11/2016 | Rossato et al. | | |
| 9,510,018 B2 | 11/2016 | Rossato et al. | | |
| 9,621,887 B2 | 4/2017 | Rossato et al. | | |
| 9,626,772 B2 | 4/2017 | Rossato et al. | | |
| 9,706,206 B2 | 7/2017 | Rossato et al. | | |
| 9,961,345 B2 | 5/2018 | Rossato et al. | | |
| 10,609,381 B2 | 3/2020 | Meardi et al. | | |
| 10,623,745 B2 | 4/2020 | Damnjanovic et al. | | |
| 10,735,024 B2 | 8/2020 | Handford | | |
| 10,841,625 B2 | 11/2020 | Mittal | | |
| 10,873,772 B2 | 12/2020 | Rossato et al. | | |
| 10,911,762 B2 | 2/2021 | Mittal | | |
| 10,932,016 B2 | 2/2021 | Clucas | | |
| 10,951,930 B2 | 3/2021 | Mittal et al. | | |
| 10,992,943 B2 | 4/2021 | Handford | | |
| 10,992,959 B2 | 4/2021 | Damnjanovic | | |
| 11,039,154 B2 | 6/2021 | Damnjanovic et al. | | |
| 2004/0208239 A1* | 10/2004 | Karlsson | ............... | H04K 3/82 375/219 |
| 2007/0179948 A1* | 8/2007 | Jennings, III | ....... | H04L 67/1068 |
| 2008/0062168 A1* | 3/2008 | Poullier | ............ | H04N 1/00132 345/419 |
| 2008/0170630 A1* | 7/2008 | Falik | ............... | H04L 47/26 375/E7.193 |
| 2009/0034629 A1* | 2/2009 | Suh | ................ | H04N 21/41407 375/240.27 |
| 2009/0187960 A1* | 7/2009 | Lee | ................ | H04N 21/234327 375/E7.078 |
| 2009/0222855 A1* | 9/2009 | Vare | ............... | H04L 12/189 725/39 |
| 2009/0268806 A1* | 10/2009 | Kim | .............. | H04N 21/84 375/316 |
| 2010/0260254 A1* | 10/2010 | Kimmich | ............. | H04N 19/164 375/240 |
| 2010/0260268 A1* | 10/2010 | Cowan | ............... | H04N 13/178 348/E13.001 |
| 2011/0002397 A1* | 1/2011 | Wang | ................. | H04N 19/30 375/240.26 |
| 2011/0096828 A1* | 4/2011 | Chen | ................ | H04N 21/8456 375/E7.126 |
| 2011/0164683 A1* | 7/2011 | Takahashi | .......... | H04N 19/31 375/E7.123 |
| 2011/0187503 A1* | 8/2011 | Costa | ................ | H05K 7/1498 340/8.1 |
| 2011/0239078 A1* | 9/2011 | Luby | ............... | H04N 21/23106 714/752 |
| 2012/0185907 A1* | 7/2012 | Park | ..................... | H04N 21/242 725/110 |
| 2012/0250619 A1* | 10/2012 | Twitchell, Jr. | ....... | H04W 40/28 370/328 |
| 2012/0320168 A1* | 12/2012 | Yun | ................... | H04N 21/4347 348/51 |
| 2013/0136193 A1* | 5/2013 | Hwang | ................ | H04L 65/80 714/776 |
| 2013/0305304 A1* | 11/2013 | Hwang | ................ | H04L 65/611 725/109 |
| 2014/0098289 A1* | 4/2014 | Jang | ............... | H04N 21/440263 348/441 |
| 2014/0119456 A1* | 5/2014 | Bivolarsky | ........... | G06T 3/4053 375/E7.026 |
| 2014/0119712 A1* | 5/2014 | Jang | .................... | G11B 27/105 386/248 |
| 2014/0211861 A1* | 7/2014 | Lee | ........................ | H04N 19/89 375/240.27 |
| 2016/0227172 A1* | 8/2016 | Safaei | .................. | G06T 19/006 |
| 2019/0014335 A1 | 1/2019 | Clucas | | |
| 2019/0222851 A1 | 7/2019 | Ferrara et al. | | |
| 2020/0128293 A1 | 4/2020 | Mittal | | |

FOREIGN PATENT DOCUMENTS

| | | |
|---|---|---|
| WO | 2013-011493 | 1/2013 |
| WO | 2013-011495 | 1/2013 |
| WO | 2013-068825 | 5/2013 |
| WO | 2013-076703 | 5/2013 |
| WO | 2013-108230 | 7/2013 |
| WO | 2013-171168 | 11/2013 |
| WO | 2014-068528 | 5/2014 |
| WO | 2014-170819 | 10/2014 |
| WO | 2017-141001 | 8/2017 |
| WO | 2018-046940 | 3/2018 |
| WO | 2018-046941 | 3/2018 |
| WO | 2018-046942 | 3/2018 |
| WO | 2018-109455 | 6/2018 |
| WO | 2019-057893 | 3/2019 |
| WO | 2019-101911 | 5/2019 |
| WO | 2019-111004 | 6/2019 |
| WO | 2019-111005 | 6/2019 |
| WO | 2019-111006 | 6/2019 |
| WO | 2019-111009 | 6/2019 |
| WO | 2019-111010 | 6/2019 |
| WO | 2019-111011 | 6/2019 |
| WO | 2019-111012 | 6/2019 |
| WO | 2019-111013 | 6/2019 |
| WO | 2019-111014 | 6/2019 |
| WO | 2019-141987 | 7/2019 |
| WO | 2019-207286 | 10/2019 |
| WO | 2019-220433 | 11/2019 |

OTHER PUBLICATIONS

Search Report and Examination Report for GB 2007773.1 mailed Jan. 10, 2022.

Abdallah et al., "Adaptive Joint Source-Channel Coding Using Multilevel codes for Unequal Error Protection and Hierarchical Modulation for SPIHT Image Transmission", IEEE, 2019, 5 pp. 978-1-7281-4064-3/19/$31.00.

Final Office Action received for U.S. Appl. No. 17/380,718, filed Jun. 29, 2022, 19 pages.

Notice of Allowance received for U.S. Appl. No. 17/380,718, filed Nov. 21, 2022, 7 pages.

Office Action received for U.S. Appl. No. 17/380,718, filed Feb. 16, 2022, 9 pages.

* cited by examiner

WIRELESS DATA COMMUNICATION SYSTEM AND METHOD

CROSS-REFERENCE TO RELATED APPLICATIONS

This application is a continuation U.S. application Ser. No. 17/380,718, filed Jul. 20, 2021, which claims the benefit of and priority to UK Patent Application No. 2007773.1, filed May 25, 2020, the entire disclosures of which are incorporated herein by reference in their entireties.

1. TECHNICAL FIELD

The present disclosure relates to wireless data communication systems, for example to wireless data communication systems that communicate image or video data when in operation. Moreover, the present disclosure relates to methods of (namely methods for) using aforesaid wireless data communication systems to communicate image or video data. Furthermore, the present disclosure relates to a computer program product comprising a non-transitory computer-readable storage medium having computer-readable instructions stored thereon, the computer-readable instructions being executable by a computerized device comprising processing hardware to execute the aforesaid methods.

2. BACKGROUND

It is well known to communicate image and video data via wireless communication links, for example via satellite distribution of video content to domestic satellite receivers whose antennae are mounted to exterior walls of domestic premises (so-called "satellite TV"). Moreover, various data formats are employed when communicating data via the wireless communication links; for example, data formats such as H.264, MPEG2 and MPEG4 are often employed.

A technical problem arises when the aforesaid wireless communication links are more spatially local to a given region, and where the wireless communication links include various intermediate relay nodes (for example, wireless peer-to-peer networks). Problems such as wireless signal fading, ghosting due to signal reflection and interference from extraneous wireless radiation emitters can cause a much high bit error rate than encountered with aforesaid satellite data communication links. Such spatially local wireless communication links are also susceptible to having operating parameters that temporally dynamically vary, especially when sources of wireless signals are mobile, for example are vehicle-mounted or are airborne.

Companies specializing in conveying image data via wireless data communication links are known, for example a company Amimon Ltd., based in Israel. In a patent application WO2019/220433A1 ("Joint Source Channel Coding with H.264 Video Compression"; Applicant Amimon Ltd. (IL)), there is disclosed a wireless video transmission system comprising:
  a coarse compression module to compress a video frame and to generate coarse data of the video frame;
  a coarse decompression module to generate a coarse frame information from the coarse data;
  a distortions extractor to generate coarse distortions from the coarse frame information and from the video frame;
  a refinement data encoder to generate refinement data from the coarse distortions based on the coarse frame information; and
  a data combining and modulation module to combine and transmit the coarse data and the refinement data.

It is known that wireless video transmission systems which combine a use of joint source channel coding (JSCC) with known compression block techniques including compression standards such as, for example, H.265, potentially suffer from bandwidth overhead. For example, a system that combines H.265 data with "analog" refinement data is susceptible to employing "coarse" bins and "fine" bins where the coarse bins are used for sending H.265 data (including interframe prediction) and the fine bins are used for sending the data for memoryless refinement of the received image. The analog refinement potentially has video-content-dependent power, and potentially suffers from additive noise and therefore, it may be desired to apply a video-content-dependent gain to bring the transmitted power to the highest level available by hardware capabilities and the radio regulation. However, a drawback of using content-dependent gain is that the gain should be conveyed to the receiver, and the message which describes that gain, creates a bandwidth overhead. Video-content-dependent gain may optionally be applied to single blocks (that is, each block will have a different gain), or to group of blocks (that is, each group will have different gain, but all the blocks in the group will have the same gain).

Bandwidth overhead in video transmission systems combining use of known compression block techniques (for example, H.264 or H.265) with JSCC may be reduced, optionally eliminated, by utilizing information associated with the coarse data to generate control data for the refinement encoder, where the refinement encoder generates refinement data which may be transmitted to a video receiver for memoryless refinement of a video image. The transmission side may include a refinement encoder which may be adapted to perform a two-dimensional DCT transform on coarse distortions which may be in the form of error frames (in the pixel domain) or in the form of quantization errors of DCT taps generated from the coarse data to generate DCT taps for each block. The refinement encoder may additionally calculate the block energy to apply a gain to the coarse distortions DCT taps based on the power of the coarse DCT taps. Alternatively, the refinement encoder may estimate a probability density for the coarse DCT taps which may then be used to entropy encode the coarse distortions DCT taps. A compander may be used to apply non-linear gain to the DCT taps of the refinement encoder.

Implementations of JSCC are described in a technical publication "Handbook_Image_Video_Processing", and in particular: "Chapter 1: Joint Source-Channel Coding for Video Communications" (authors Fan Zhai, Yiftach Eisenberg, and Aggelos K. Katsaggelos) http://users.eecs.northwestern.edu/~fzhai/publications/Handbook_Image_Video-_Processing_boo kchapter.pdf However, such known approaches based on JSCC do not provide a sufficiently low latency performance for many applications of use, that require substantially immediate image communication from a given source to a given recipient. Although JSCC seeks to combine source data compression with transmission channel compression and forward error correction (FEC) functionality to provide improved data transmission with less errors when transmission channel dropout, fading and interference are likely to be encountered, it is desirable to provide a yet further improved performance to cope with performance requirements for many applications of use situations.

SUMMARY

The present disclosure seeks to provide an improved an improved data communication system that are less affected by objective technical problems as described in the foregoing.

According to a first aspect, there is provided a data communication system including a least one encoder and at least one decoder, wherein the at least one encoder, when in operation, encodes an input signal received thereat into encoded output data;

wherein the data communication system includes a data communication network that is coupled to at least one encoder, wherein the data communication network, when in operation, communicates the encoded output data from the at least one encoder to the at least one decoder;

wherein the at least one decoder, when in operation, decodes the encoded output data to generate a rendition of the input signal, characterized in that the data communication network is configured to function according to joint source channel coding (JSCC);

the encoder and the decoder are configured to employ an hierarchical data structure for representing data to be communicated from the at least one encoder to the at least one decoder, wherein the hierarchical data structure includes a base layer and one or more enhancement layers with associated residual data, wherein the base layer is capable of providing a coarse rendition of the input signal at the at least one decoder, and the one or more enhancement layers and their associated residual data are useable when received at the least one decoder to enhance the coarse rendition to render the input signal at a high level of quality than the coarse rendition; and the at least one encoder is operable selectively to drop sending parts of data of the one or more enhancement layers and their associated residual data in response bandwidth limitations, ghosting, interference and/or data errors arising in the data communication network.

The invention is of advantage in that using a hierarchical structure to represent data in the encoded output data communicated pursuant to JSCC from the at least one decoder to the at least one decoder is able to render the system better able to cope with signal fading, data corruption, data loss, ghosting and other types of data degradation arising in the data communication network.

Optionally, in the data communication system, the at least one encoder is configured to send base layer data of a given image frame to the at least one decoder to decode concurrently with the at least one encoder computing enhancement layer data of the given image frame to send subsequently to the at least one decoder, thereby reducing a latency of data communication arising when communicating from the at least one encoder to the at least one decoder.

Optionally, in the data communication system, the at least one encoder is configured to drop sending enhancement layer data and resend base layer data of a given image frame in an event that a first transmission of the base layer data of the given image frame is corrupted when transmitted from the at least one encoder to the at least one decoder.

Optionally, the system is configured to spread data of a given Intra-frame of the input signal into a plurality of frame durations when communicated from the at least one encoder to the at least one decoder.

According to a second aspect, there is provided a method of operating a data communication system including a least one encoder and at least one decoder, wherein the at least one encoder, when in operation, encodes an input signal received thereat into encoded output data;

wherein the data communication system includes a data communication network that is coupled to at least one encoder, wherein the data communication network, when in operation, communicates the encoded output data from the at least one encoder to the at least one decoder;

wherein the at least one decoder, when in operation, decodes the encoded output data to generate a rendition of the input signal, characterized in that the method includes:

configuring the data communication network to function according to joint source channel coding (JSCC);

configuring the encoder and the decoder to employ an hierarchical data structure for representing data to be communicated from the at least one encoder to the at least one decoder, wherein the hierarchical data structure includes a base layer and one or more enhancement layers with associated residual data, wherein the base layer is capable of providing a coarse rendition of the input signal at the at least one decoder, and the one or more enhancement layers and their associated residual data are useable when received at the least one decoder to enhance the coarse rendition to render the input signal at a high level of quality than the coarse rendition; and configuring the at least one encoder, when in operation, selectively to drop sending parts of data of the one or more enhancement layers and their associated residual data in response bandwidth limitations, ghosting, interference and/or data errors arising in the data communication network.

Optionally, the method further includes configuring the at least one encoder to send base layer data of a given image frame to the at least one decoder to decode concurrently with the at least one encoder computing enhancement layer data of the given image frame to send subsequently to the at least one decoder, thereby reducing a latency of data communication arising when communicating from the at least one encoder to the at least one decoder.

Optionally, the method further includes configuring at least one encoder to drop sending enhancement layer data and resend base layer data of a given image frame in an event that a first transmission of the base layer data of the given image frame is corrupted when transmitted from the at least one encoder to the at least one decoder.

Optionally, the method further includes configuring the system to spread data of a given Intra-frame of the input signal into a plurality of frame durations when communicated from the at least one encoder to the at least one decoder.

According to a third aspect, there is provided a computer program product comprising a non-transitory computer-readable storage medium having computer-readable instructions stored thereon, the computer-readable instructions being executable by a computerized device comprising processing hardware to execute a method of the second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Low complexity enhancement video coding (LCEVC) is now well known through various published patent applications that hereby incorporated by reference:

PCT/IB2012/053660; PCT/IB2012/053722; PCT/IB2012/053723
PCT/IB2012/053725; PCT/IB2012/056689; PCT/IB2012/002286
PCT/IB2013/050486; PCT/EP2013/059833; PCT/IB2013/059847
PCT/IB2014/060716; PCT/GB2016/050632; PCT/GB2017/052631
PCT/GB2017/052632; PCT/GB2017/052633

LECVC employs a hierarchical structure to represent image data, wherein there is provided a base layer, together with one or more enhancement layers having associated therewith residual data. In an encoder, the base layer is generated by downsampling an input signal and then encoding the downsampled input signal to generate the base layer. Moreover, in the encoder the downsampled input signal is upsampled and subtracted from the input signal to generate enhancement layer data. Optionally, in the encoder, data for a plurality of enhancement layers can be generated, wherein each enhancement layer can have sub-layers relating to particular image parameters, for example luminosity and colour. Optionally, the downsampling and upsampling can employ mutually different functions, such that the downsampling is not merely an inverse of the upsampling; this enables entropy present in the residual data to be optimized for compression. In the encoder, or a subsequent unit to the encoder, the base layer data and the enhancement layer data is combined and then compressed to provide output data for transmission from the encoder to one or more decoders. Such transmission can occur, for example, via a wireless link, for example a wireless satellite data communication link.

In a LCECVC decoder, the output data is received and decoded to provide a rendition of the base layer. Thereafter, the one or more enhancement layers are decoded and their associated residual data is applied to the rendition of the base layer to enhance a quality of the base layer to a high level of quality, for example enhanced resolution, enhanced colour resolution and so forth.

Figure 1:
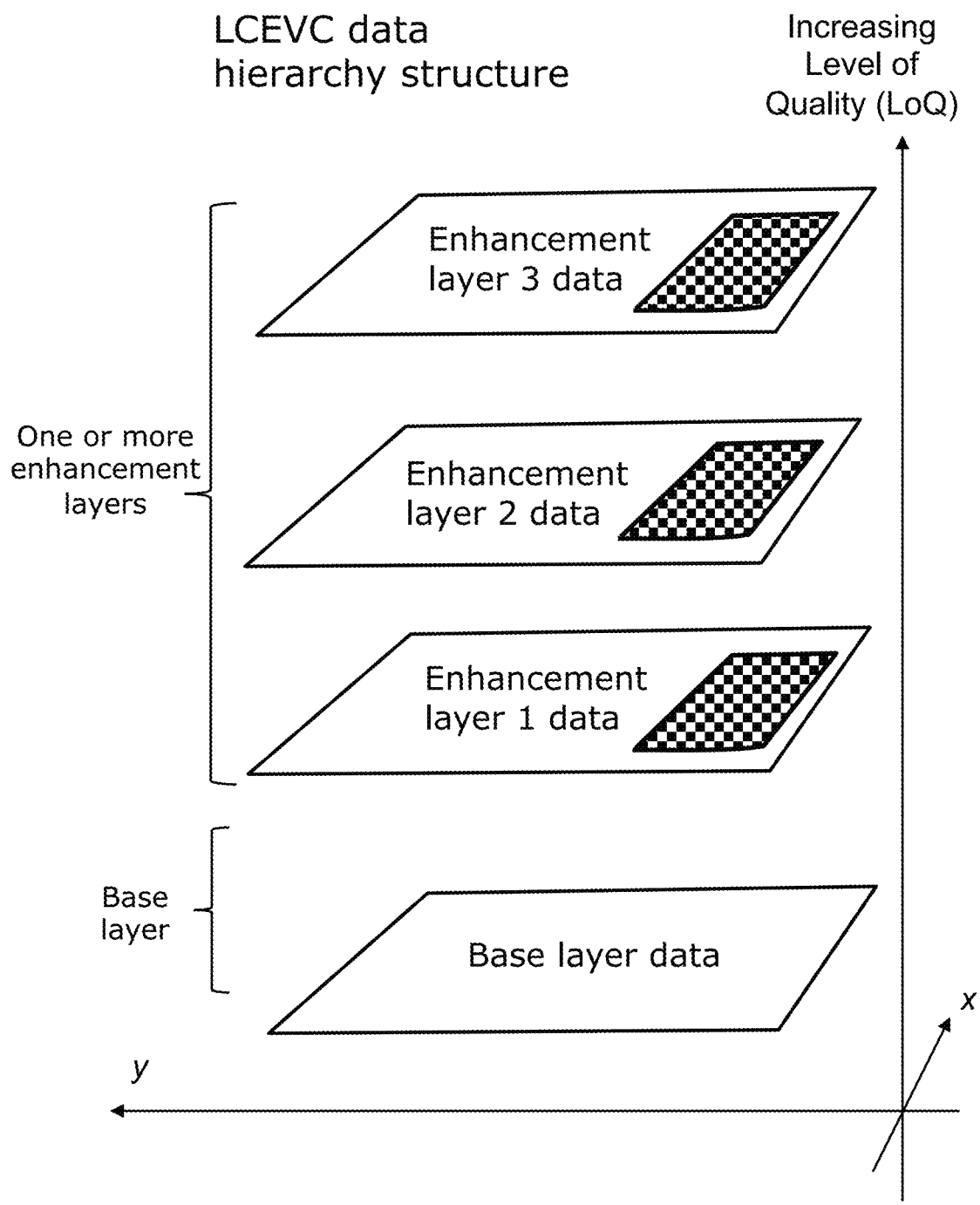
FIG. 1 is a schematic illustration of a data structure employed to represent an image frame in LCEVC, wherein the data structure includes a base layer, and one or more enhancement layers; optionally, the one or more enhancement layers each include a plurality of sub-layers; by selectively omitting enhancement layers or sub-layers when LCEVC is employed in JSCC, bit-rate of data communicated from a given encoder to a given decoder can be conveniently dynamically varied to cope with transmission interferences, bandwidth limitations and ghosting effects, for example as encountered in wireless communication.
Figure 2:
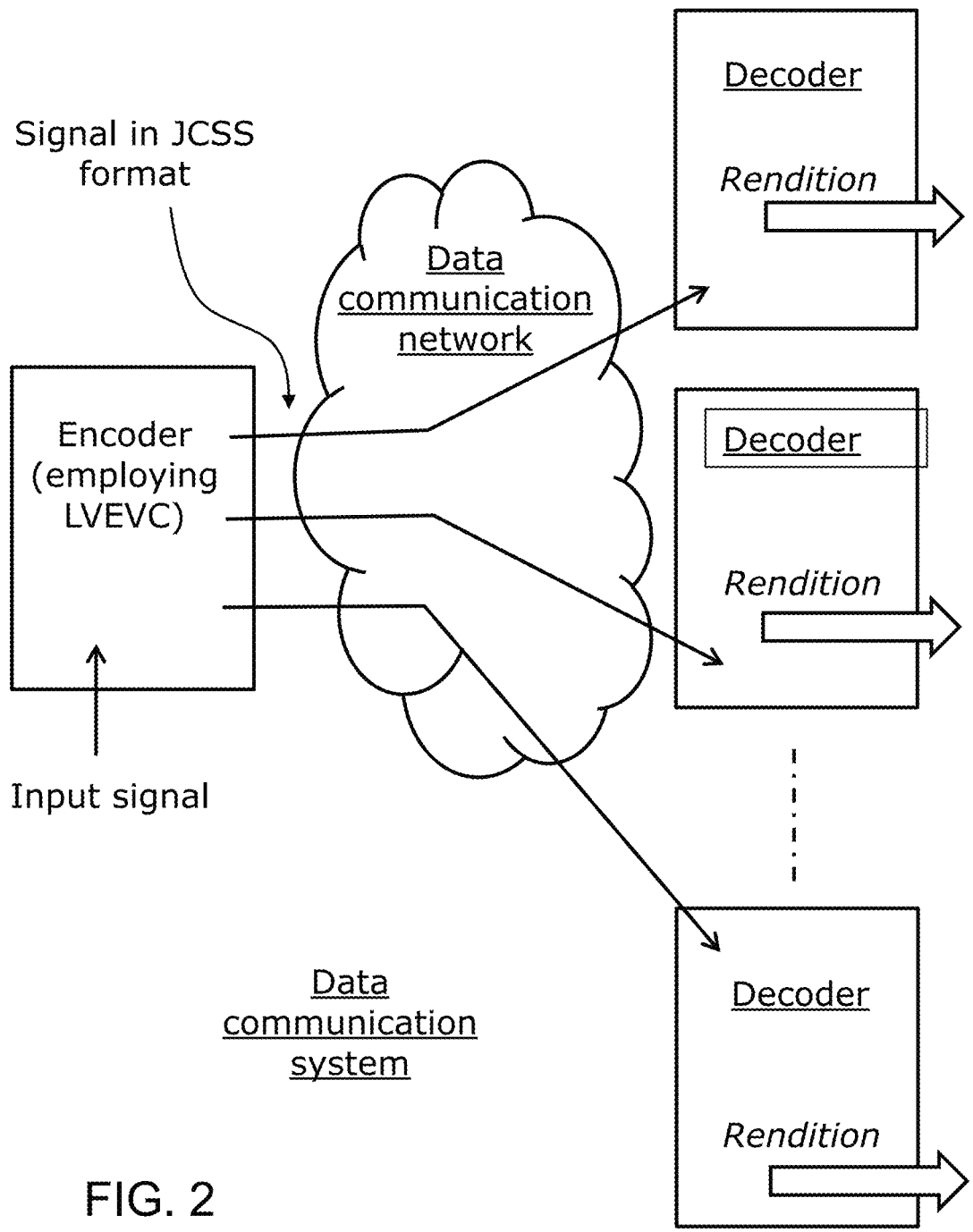
FIG. 2 is a schematic illustration of a data communication system including an encoder, a data communication network, for example implemented wirelessly via one or more wireless channels, for example a plurality of radio channels, and one or more decoders, for example a plurality of decoders; the system operates according to JSCC and a LCEVC data structure employing a hierarchical representation of image frames is employed when communicating data from the encoder to the one or more decoders.
Figure 3:
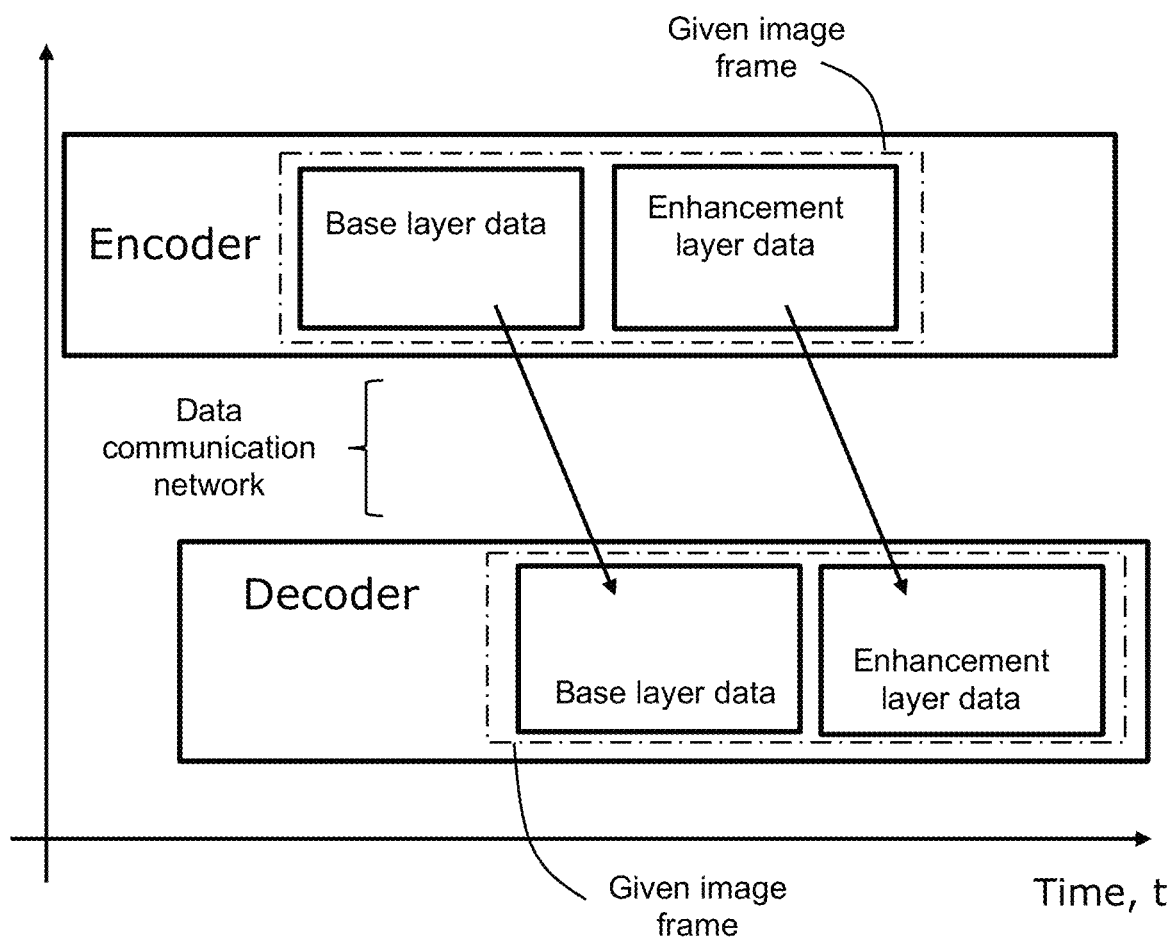
FIG. 3 is a schematic illustration of temporal overlapping employed in the data communication system of FIG. 2 to reduce an operating latency of the system.

The LCEVC encoder and the LCEVC decoder can be considered together as being a LCEVC codec. Such an LCEVC codec is of advantage in that it provides scalability; in other words, when communicating the output data from the encoder to the decoder, certain enhancement layers can be optionally omitted, and certain residual data can be omitted in order to provide dynamic bit-rate control to the output data communicated from the encoder to the decoder. Moreover, when operation of the codec is not lossless, for example as a result of employing quantization in the encoder when encoding image or video data, quantization parameters can be dynamically varied in order to provide bit-rate control to the output data. Such temporally dynamic operation of LCEVC makes it especially suitable for use in systems employing wireless communication, where a data transmission link from a source to a recipient can be temporally variable and subject to ghosting and interference. Thus, LCEVC used in a context of JSCC is able to provide enhanced performance on account of the flexible hierarchical manner in which LCEVC functions. Moreover, use of LCEVC in a context of JSCC is capable of providing a lower degree of latency, because, for a given image frame, the base layer data can be communicate firstly from the encoder to the decoder for the decoder to start decoding, while enhancement layer data is then communicated from the encoder to the decoder. By employing temporally overlapping communication of the layers of LCEVC from a given encoder to a given decoder, latency can be considerably reduced, for example as depicted in FIG. 1.

A combination of joint source channel coding (JSCC) and LCEVC, as described in the foregoing, has hitherto not been proposed. Likewise, a combination of JSCC and VC-6 has hitherto not been proposed. Such a combination allows a greater bit-rate control precision to be achieved when communicating data from a given encoder to a given decoder via a data communication link, for example a wireless data communication link. Selective dropping of layers in the LCEVC data structure allows for fine precision control of bitrate for example.

During transmission of the output data from a given encoder, or even when the output data is received at a given decoder, the enhancement provided by the one or more enhancement layers of LCEVC can be dropped, without need for retransmission of data packets associated with the dropped layers of LVEVC. When this happens, however, it is highly beneficial to implement a feedback loop signal to the given encoder, which must force an enhancement temporal buffer refresh for a following image frame (or an image frame subsequent thereto, if the signal arrives too late at the given encoder), in order to avoid ghosted/sticky residuals in the enhancement layers of LCEVC.

As aforementioned, data of the base layer can be transmitted from the given encoder to the given decoder, while data of the one or more corresponding enhancement layers is still being computed in the given encoder; this inherently gives priority to data packets of the base layer, which, if lost in transmission, can be retransmitted (optionally, at an expense of correspond enhancement layer data being dropped from transmission from the given encoder to the given decoder).

When communicating data from the given encoder to the given decoder, data associated with a given intra-frame (namely "I-frame", namely a complete image frames from which other frames can be derived, for example from motion estimation implemented in the encoder and decoder) can be spread over a plurality of frames intervals in data communicated to the decoder; such an implementation reduces peak data rates when communicating from the given encoder to the given decoder. Such spreading worsens an overall average bitrate required to communicate from the given encoder to the given decoder, but it dramatically reduces the size of the I-frame, which is a big driver of buffers as well as overall latency within the aforesaid system of the present disclosure. However, achieving a low latency, for example less than 50 milliseconds (mS) is highly desirable in video conferencing systems, and in remotely-controlled robotics where a captured image is communicated to a remote location where, for example, an artificial intelligence cognitive engine AI engine processes the capture image to decide how to respond, for example by controlling actuators. If there is a high degree of latency, such remote control can function in an unstable or sluggish manner. In general, implementing JSCC using LCEVC is capable of reducing a data error rate occurring within the aforesaid system, and retransmission of enhancement layer packets can be potentially avoided.

Beneficially, when one or more enhancement layers, and/or one or more enhancement sub-layers are dropped, a subtle level of dithering is applied to at least partially reconstruct high frequencies that have been lost that would have otherwise being conveyed in these enhancement layers or sub-layers, for example to avoid visible aliasing at diagonal edges when the image is reconstructed and rendered at the given decoder. Such dithering is option done after encoding, by using a transmission system to intervene in a header of data to be sent from the given encoder to the given decoder; however, it will be appreciated that such a transmission system is employed to intervene in order to drop one or more enhancement layers or sub-layers in anyway. The transmission system beneficially signals a suitable dither strength/magnitude.

In the aforesaid system, it is much better to reduce the amount of enhancement data to be communicated on a given frame in order to retain control of quality rather than just forcing a reset; (such a reduction is also important in a situation where whole enhancement data is being dropped), so that it is feasible to adjust instantly a size of the enhancement data based on a given channel quality to be achieved, while always maintaining a base level of quality. Thus, in an event that communicating data of the base layer from the given encoder to the given decoder, it is beneficial to reduce a size of the enhancement data, which assists to reduce latency arising within the system.

In embodiments of the present disclosure, it is highly beneficial to have a least two mutually separate elements (namely base layer data in a first case, and one more enhancement layer data in a second case) where it is feasible to employ mutually different channel data-bit rates, and most importantly wherein it is feasible to adjust dynamically the channel rate and the underlining data bit rate together to maximize quality or minimize latency. For latency reduction purposes, it is desirable to send a maximum amount of data in a shortest amount of time in a "burst" that does not take a whole 'video frame' to send the data, otherwise relatively little latency reduction gain is achieved (apart from avoiding resend requests). Moreover, with aforesaid temporally overlapping of data transmission of hierarchically structured data as employed in LCEVC, it is feasible to allow more time for accommodating transmission a normal full frame codec would require, thereby enabling an increase in image rendition quality at the given decoder to achieved (namely effectively increases bitrate) without increasing latency.

One potential hierarchical coding algorithm that is optionally used in embodiments of the present disclosure is a proprietary Perseus™ Pro product from V-Nova International Ltd. (which has byte-stream format elements that allow for partial and parallel decoding, and that uses a static entropy decoding rather than an adaptive entropy decoding); a proprietary Perseus™ Pro product from V-Nova International Ltd is also described in the following US patent applications, which are hereby incorporated by reference:

13/188,188, 13/188,201, 13/188,207, 13/188,220, 13/188,226, 13/352,944, 13/188,237, 13/303,554, 13/744,808, 13/893,665, 13/893,669, 13/894,417, 13/893,672, 13/893,677, 15/783,204, 15/779,193, 16/077,828, 16/103,784, 16/078,352, 16/126,939, 16/252,357, 16/252,362, 16/324,433, 16/324,431, 16/295,847, 16/295,851, 16/295,854 as well as in the following PCT patent applications, which are hereby incorporated by reference PCT/GB2017/053716, PCT/EP2018/075603, PCT/EP2018/082350, PCT/GB2018/053551, PCT/GB2018/053556, PCT/GB2018/053553, PCT/GB2019/050122, PCT/GB2018/053552, PCT/GB2019/051104, PCT/GB2018/053546, PCT/GB2018/053555, PCT/GB2018/053547, PCT/GB2018/053554, PCT/GB2018/053548.

It is to be understood that any feature described in relation to any one embodiment may be used alone, or in combination with other features described, and may also be used in combination with at least one feature of any other of the embodiments, or any combination of any other of the embodiments. Furthermore, equivalents and modifications not described above may also be employed without departing from the scope of the invention, which is defined in the accompanying statements.

The invention claimed is:

1. A data decoding system comprising:
   at least one decoder;
   wherein the system is communicatively coupled to a data communication network;
   wherein the system is configured to receive encoded data from an encoder and the at least one decoder is configured to decode the received encoded data;
   wherein the received encoded data has been encoded in an hierarchical data structure for representing data to be communicated from the encoder to the at least one decoder, wherein the hierarchical data structure includes a base layer and one or more enhancement layers with associated residual data, wherein the base layer is capable of providing a coarse rendition of the input signal at the at least one decoder, and the one or more enhancement layers and their associated residual data are useable when received at the least one decoder to enhance the coarse rendition to render the input signal at a higher level of quality than the coarse rendition; and
   wherein the at least one decoder is configured to receive and decode lower level data when parts of data of the one or more enhancement layers and their associated residual data have been selectively dropped or not received in response to bandwidth limitations, ghosting, interference and/or data errors arising in the data communication network; and
   wherein the at least one decoder is configured to receive base layer data of a given image frame from the encoder to decode concurrently with the encoder computing enhancement layer data of the given image frame to send subsequently to decoder, thereby reducing a latency of data communication arising when communicating from the encoder to the at least one decoder.

2. The data decoding system of claim 1, wherein the at least one decoder is configured to receive base layer data of a given image frame to decode concurrently with the encoder computing enhancement layer data of the given image frame to send subsequently to the at least one decoder, thereby reducing a latency of data communication arising when communicating from the at least one encoder to the at least one decoder.

3. The data decoding system of claim 1, wherein the at least one decoder is configured to receive resent base layer data when the encoder has dropped enhancement layer data of a given image frame in an event that a first transmission of the base layer data of the given image frame was corrupted when received by the at least one decoder.

4. The data decoding system of claim 1, wherein the system is configured to receive data of a given Intra-frame of the input signal which has been spread into a plurality of frame durations when communicated from the encoder to the at least one decoder.

5. A method of receiving and decoding data at a data decoding system that includes at least one decoder, the method comprising:
   the at least one decoder receiving encoded data from an encoder;
   the encoded data having been encoded by the encoder in an hierarchical data structure for representing data to be communicated from the encoder to at least one decoder, wherein the hierarchical data structure includes a base layer and one or more enhancement layers with associated residual data, wherein the base layer is capable of providing a coarse rendition of the input signal at the at least one decoder, and the one or more enhancement layers and their associated residual data being useable when received at the least one decoder to enhance the coarse rendition to render the input signal at a high level of quality than the coarse rendition;
   the at least one decoder configured to receive and decode lower level data when parts of data of the one or more enhancement layers and their associated residual data have been selectively dropped or not received in response to bandwidth limitations, ghosting, interference and/or data errors arising in the data communication network;
   the at least one decoder configured to receive base layer data of a given image frame from the encoder to decode concurrently with the at least one encoder computing enhancement layer data of the given image frame to send subsequently to the at least one decoder, thereby reducing a latency of data communication arising when communicating from the at least one encoder to the at least one decoder; and
   the decoder decoding the received encoded data.

6. The method of claim 5, wherein the method further comprises the decoder receiving base layer data of a given image frame and decoding the base layer data concurrently with the encoder computing enhancement layer data of the given image frame to send subsequently to the at least one decoder, thereby reducing a latency of data communication arising when communicating from the at least one encoder to the at least one decoder.

7. The method of claim 5, wherein the method further comprises receiving resent base layer data when the encoder has dropped enhancement layer data of a given image frame in an event that a first transmission of the base layer data of the given image frame was corrupted when received by the at least one decoder.

8. The method of claim 5, wherein the method further comprises receiving data of a given Intra-frame of the input signal which has been spread into a plurality of frame durations when communicated from the encoder to the at least one decoder.

9. A computer program product comprising a non-transitory computer-readable storage medium having computer-readable instructions stored thereon, the computer-readable instructions being executable by a computerized device comprising processing hardware to execute the method of claim 5.

* * * * *